United States Patent Office 3,635,927
Patented Jan. 18, 1972

3,635,927
POLYMERIZATION PROCESSES USING A 3-COM-PONENT INITIATOR SYSTEM
Richard Johnston, Reading, England, assignor to The Gillette Company, Boston, Mass.
No Drawing. Filed Jan. 28, 1969, Ser. No. 794,796
Claims priority, application Great Britain, Feb. 12, 1968, 6,838/68
Int. Cl. C08f *3/76, 3/90, 7/04*
U.S. Cl. 260—88.7                                       8 Claims

ABSTRACT OF THE DISCLOSURE

This invention is concerned with initiation systems for the polymerization of ethylenically unsaturated monomers in aqueous media. Generally, the initiation system comprises (1) a water-soluble ferrous or ferric salt, (2) a water- soluble peroxide or persalt, and (3) a water-soluble organic compound which is capable of forming a complex with ferrous or ferric ions and does not exhibit substantial degradative transfer activity in the polymerization reaction.

---

It has been found that the polymerization of ethylenically-unsaturated monomers in aqueous media can be effectively initiated by an initiator system comprising (i) a water-soluble ferrous or ferric salt, (ii) a water-soluble peroxide or persalt and (iii) certain water-soluble organic compounds.

Substantially all compounds which have a terminal double bond and which can be polymerized by free radicals in the presence of water, can be polymerized with this initiator system. Preferred monomers are vinyl and allyl compounds such, for example, as styrene, vinyl acetate, and acrylic and methacrylic acid and derivatives thereof, such as acrylic and methacrylic acid esters, amides and nitriles, for example, methyl methacrylate, N-ethylmethacrylamide (NEMA) and acrylonitrile (AN). The polymerization may be carried out with the monomer in suspension, dispersion or solution in the aqueous polymerization medium.

Any water-soluble ferrous or ferric salt can be used as component (i) of the initiator system provided that the anion thereof does not interfere with the polymerization; since chloride ions have a deleterious effect on the polymerization, ferrous and ferric chloride should not be used. Preferred salts are, for example, ferous sulphate, ferrous ammonium sulphate and ferric nitrate. Initiator systems containing ferrous salts are, in general, somewhat more efficient than systems containing ferric salts.

Any water-soluble peroxide or persalt can be used as component (ii) of the initiator system, water-soluble persulphates, such as potassium persulphate, being particularly preferred.

The organic compound used as component (iii) of the initiator system is an aliphatic or aromatic compound which (a) is water-soluble, (b) is capable of forming a complex with ferrous or ferric ions, (c) contains one or more —COOH, —SO₃H or —CHO substituents and/or two or more substituents selected from the group consisting of free hydroxy and amino groups, or contains at least two acidic functions selected from the group consisting of —COOH and —SO₃H groups when there are less than two hydroxy or amino substituents present, and (d) does not act as a degradative transfer agent in the polymerization of the monomer with which the initiator is used. The expression degradative transfer agent is used herein in its usual sense in the polymer art, that is to mean an agent which inhibits or retards polymerization. Suitable organic compounds include, for example, the following:

containing OH only
  1,2-dihydroxy-benzene
containing —COOH only
  oxalic acid, HOOC.COOH
containing OH and —COOH
  tartaric acid, HOOC.CHOH.CHOH.COOH
  dihydroxy tartaric acid, $$HOOC.C(OH)_2.C(OH)_2.COOH$$

citric acid, HOOC.CH₂.C(OH)(COOH).CH₂.COOH
  glyceric acid, CH₂OH.CHOH.COOH
  malic acid, HOOC.CHOH.CH₂.COOH
  2,6- and 3,4-dihydroxybenzoic acid
containing NH₂ and —COOH
  3,5-diamino-benzoic acid
  aspartic acid, HOOC.CH(NH₂).CH₂.COOH
containing OH and —SO₃H
  1,2-dihydroxy-benzene-3,5-disulphonic acid
containing OH and —CHO
  3,4-dihydroxy-benzaldehyde
containing OH, NH₂ and COOH
  2-hydroxy-4-amino-benzoic acid.

The classes of water-soluble organic compounds which have been found particularly useful in the systems of this invention are as follows:

(A) unsubstituted dibasic lower aliphatic acids containing less than 4 carbon atoms
(B) polyhydroxy lower aliphatic mono-carboxylic acids containing less than seven and preferably less than five carbon atoms
(C) monohydroxy-, monoamino- and polyhydroxy-lower aliphatic di- and tri- carboxylic acids containing less than seven carbon atoms, and
(D) benzes which are substituted by at least two hydroxy groups or by the combination of (a) at least one substituent selected from the group consisting of —COOH, SO₃H and —CHO groups, and (b) at least two substituents selected from the group consisting of hydroxy and amino groups.

The combination of a water-soluble ferrous salt and a water-soluble persulphate is a known initiator system for the aqueous polymerization of ethylenically unsaturated compounds, but we have found that the efficiency of this system is remarkably potentiated by the addition of the foregoing organic compounds. This potentiation is particularly observed when polymerization is carried out at relatively low temperatures, for example 30 to 40° C. At such temperatures, the yield of polymer in a given time is increased from 5 to 20-fold by the use of the three component initiator system as compared with the use of a two component, ferrous salt/persulphate, system under otherwise identical conditions. The most effective organic compounds from this point of view, i.e., of improving the effectiveness of the initiator system, are tartaric acid and dihydroxy tartaric acid.

It is necessary for the organic compound to possess all four characteristics, (A), (B), (C) and (D), mentioned above. While there are many compounds which meet characteristics (C) and (D), those which do not form complexes with ferrous or ferric ions are not effective. Thus while oxalic acid is effective, the homologous compound succinic acid is ineffective. Similarly there are a number of organic compounds that form complexes with ferrous or ferric ions, but which do not meet characteristics (C) and (D) with regard to the substituents therein and which are ineffective.

When the organic compound meets characteristic (C) by the presence of hydroxy or amino groups therein, it is important that they should be free, i.e., unsubstituted. Thus while 3,4-dihydroxy-benzoic acid is effective, 3,4- dimethoxy-benzoic acid is ineffective and while 3,4-dihydroxy-benzaldehyde is effective, the methylene ketal derivative of this compound is ineffective.

Some organic compounds while possessing characteristics (A), (B) and (C), do not possess characteristic (D) with respect to one or more specific monomers. For example, when aspartic acid or 2-hydroxy-4-amino-benzoic acid is used as component (iii) of the initiator system, polymerization of acrylonitrile does not proceed satisfactorily (due to the degradative chain transfer action these compounds in the polymerization of this monomer), but the polymerization of, for example, N-ethylmethacrylamide proceeds satisfactorily when these compounds are used as component (iii).

Suitable concentrations for each of the three components of the initiator system in the reaction medium are from $10^{-4}$ mol/litre to 1 mol/litre, and preferably from $10^{-4}$ mol/litre to $10^{-1}$ mol/litre. The organic compound is preferably present in the same concentration as the ferrous or ferric salt; if the concentration of organic compound is greater than that of the ferrous or ferric salt there is no improvement in the polymer yield over that obtained with equal concentrations. The three component initiator system has been found effective at pH's from 2 to 8, pH's from 2 to 4 being preferred.

The polymerization initiator systems of the present invention are particularly useful when it is desired to deposit polymer in keratinous fibers, such as wool and human hair. The polymerization of a monomer such as acrylonitrile in wool yields a fibre which is (a) tougher and more hard-wearing, (b) more hydrophobic, and (c) cheaper weight for weight, than pure wool. By suitably choosing the monomer, the fibres can be given permanent pleating properties. The polymerization of a monomer in human hair an be used to effect permanent waving of the hair.

The deposition of polymers in human hair must be carried out at relatively low temperatures since the maximum temperature which the human head can tolerate is in the region of 40° C. The initiator systems of the present invention are operative at temperatures below 40° C. and they contain only medically acceptable components. Acrylonitrile and styrene are medically unsuitable monomers for this purpose, but N-ethylmethacrylamide is acceptable and has been found to be particularly useful.

Polymer may be deposited in wool by placing the wool in an aqueous mixture of monomer and initiator. Alternatively, the wool may be pre-soaked in one or two of the initiator components and then placed in an aqueous mixture of monomer and the third initiator component.

The preferred method for carrying out polymerization of a monomer in hair, or wool is as follows. The fibres (wool or hair) are soaked in a solution of potassium persulphate ($10^{-2}$ moles/litre) and tartaric acid ($10^{-2}$ moles/litre) for 15 minutes. The fibres are then removed from this solution and immersed in a solution containing 5–10% by weight of the monomer and ferrous sulphate ($10^{-2}$ moles/litre), for 30 minutes. The fibres are then removed from the solution, washed with water and dried. When the polymerization reaction is carried out on the human head, the reagents may be applied by a "comb-on" technique using thickened solutions or by simple soaking.

Because of the close-packed structure of hair, a controlled amount of reduction should be effected prior to polymerization to facilitate diffusion of the reactants into the hair. This is most easily achieved by immersing the hair in molar ammonium bisulphite for 30 minutes at a pH=8. The hair is then treated with persulphate and tartaric acid as described above.

Using acrylonitrile as monomer, weight gains of up to 20% can easily be obtained on wool, and using NEMA, even greater weight gains can be obtained.

In order that the invention may be more fully understood, the following examples are given by way of illustration only. The results of tests carried out using a two component initiator system without any organic compound and using organic compounds not meeting the three characteristics mentioned above are also given for the purpose of comparison.

In the following examples all polymerizations were carried out at standardized conditions. Two monomers were used, N-ethylmethacrylamide (NEMA) and acrylonitrile (AN). In the case of NEMA, a 10% by weight solution of the monomer in distilled water was prepared and potassium persulphate, ferrous sulphate or ferric nitrate and an organic compound were added to the solution, the potassium persulphate in an amount to give a concentration of $10^{-2}$ mol/litre and the ferrous or ferric salt and the organic compound in an amount to give a concentration of $10^{-3}$ mol/litre. The pH of the mixture was adjusted to 2 by the addition of sulphuric acid and oxygen was removed from the solution by bubbling oxygen-free nitrogen through it.

10 ml. of the resulting mixture was taken and was maintained at 30° C. for 30 minutes. The polymer formed (if any) was precipitated (polyNEMA being soluble in water) by pouring the reaction mixture into acetone, the precipitate was filtered off, washed with acetone and dried at 40° C. under vacuum. The weight of polymer, in grams, obtained from the 10 ml. of reaction mixture is reported in the results below.

The polymerization of AN was carried out as described for NEMA except that the initial solution contained 5% by weight of AN. Polyacrylonitrile is insoluble in water and the polymer formed was simply filtered off from the reaction mixture, washed with water and acetone and dried under vacuum at 40° C.

Examples 1–19

Monomer: NEMA
Component (i): ferrous sulphate

| Example number | Organic compound | Wt. of polymer obtained g. |
|---|---|---|
| 1 | None | Trace |
| 2 | Tartaric acid | 0.453 |
| 3 | Dihydroxytartaric acid | 0.432 |
| 4 | Benzoic acid | 0.0020 |
| 5 | Citric acid | 0.2000 |
| 6 | 1,2-dihydroxy-benzene-3,5-disulphonic acid | 0.0800 |
| 7 | 3,4-dihydroxy-benzaldehyde | 0.1920 |
| 8 | Glucose | 0.0050 |
| 9 | 1,3-dihydroxy-benzene | 0.1080 |
| 10 | Oxalic acid | 0.1630 |
| 11 | Succinic acid | 0.0100 |
| 12 | Benzaldehyde | 0.0240 |
| 13 | 3,4-dimethoxy-benzoic acid | 0.0100 |
| 14 | 3,4-dihydroxy-benzoic acid | 0.2200 |
| 15 | Glyceric acid | 0.2000 |
| 16 | 1,2-dimethoxy-benzene | 0.0100 |
| 17 | 3,5-diaminobenzoic acid | 0.170 |
| 18 | 2-hydroxy-4-aminobenzoic acid | 0.174 |
| 19 | Aspartic acid | 0.0700 |

Examples 20–40

Monomer: AN
Component (i): ferrous sulphate

| Example number | Organic compound | Wt. of polymer obtained g. |
|---|---|---|
| 20 | None | 0.0830 |
| 21 | Tartaric acid | 0.3320 |
| 22 | Dihydroxytartaric acid | 0.3680 |
| 23 | 1,2-dihydroxy-benzene-3,5-disulphonic acid | 0.3100 |
| 24 | 3,4-dihydroxy-benzoic acid | 0.2600 |
| 25 | 2,6-dihydroxy-benzoic acid | 0.2220 |
| 26 | Glucose | 0.0560 |
| 27 | Benzoic acid | 0.0540 |
| 28 | 3,4-dihydroxy-benzaldehyde | 0.3420 |
| 29 | Methyleneketal of 3,4-dihydroxy-benzaldehyde | 0.0680 |
| 30 | Glyceric acid | 0.2600 |
| 31 | Citric acid | 0.2740 |
| 32 | Benzaldehyde | 0.0300 |
| 33 | Oxalic acid | 0.2960 |
| 34 | Succinic acid | 0.1050 |
| 35 | Malic acid | 0.2300 |
| 36 | Glycerol | 0.0200 |
| 37 | 3,4-dimethoxy-benzoic acid | 0.0200 |
| 38 | 3,5-diaminobenzoic acid | 0.192 |
| 39 | 2-hydroxy-4-aminobenzoic acid | 0.0745 |
| 40 [1] | Aspartic acid | Trace |

[1] Comparison.

Examples 41–55

Monomer: NEMA
Component (i): ferric nitrate

| Example number | Organic compound | Wt. of polymer obtained g. |
|---|---|---|
| 41 | None | 0.012 |
| 42 | Tartaric acid | 0.320 |
| 43 | Dihydroxytartaric acid | 0.375 |
| 44 | Citric acid | 0.305 |
| 45 | Oxalic acid | 0.262 |
| 46 | 3,4,5-trihydroxy-benzoic acid | 0.358 |
| 47 | 3,4-dihydroxy-benzoic acid | 0.125 |
| 48 | Glyceric acid | 0.060 |
| 49 | Malic acid | 0.0400 |
| 50 | 1,2-dihydroxy-benzene-3,5-disulphonic acid | 0.0200 |
| 51 | 3,4-dimethoxy-benzoic acid | 0.0150 |
| 52 | Benzoic acid | 0.0050 |
| 53 | 3,5-diaminobenzoic acid | 0.214 |
| 54 | 2-hydroxy-4-aminobenzoic acid | 0.164 |
| 55 | Aspartic acid | 0.160 |

Examples 56–73

Monomer: AN
Component (i): ferric nitrate

| Example number | Organic compound | Wt. of polymer obtained g. |
|---|---|---|
| 56 | None | 0.025 |
| 57 | Tartaric acid | 0.314 |
| 58 | Dihydroxytartaric acid | 0.332 |
| 59 | Citric acid | 0.171 |
| 60 | 3,4-dihydroxy-benzoic acid | 0.212 |
| 61 | 3,4,5-trihydroxy-benzoic acid | 0.280 |
| 62 | 3,4-dihydroxy-benzaldehyde | 0.225 |
| 63 | Malic acid | 0.162 |
| 64 | Glyceric acid | 0.151 |
| 65 | 1,2-dihydroxy-benzene-3,5-disulphonic acid | 0.228 |
| 66 | Glycerol | 0.040 |
| 67 | Glucose | 0.020 |
| 68 | 3,4-dimethoxy-benzoic acid | 0.044 |
| 69 | Benzoic acid | 0.0420 |
| 70 | Succinic acid | 0.0500 |
| 71 | 3,5-diaminobenzoic acid | 0.200 |
| 72 | 2-hydroxy-4-aminobenzoic acid | 0.0600 |
| 73 [1] | Aspartic acid | Trace |

[1] Comparison.

EXAMPLES 74–5

A sample of wool flannel (1 g.) was conditioned in an atmosphere of 65% relative humidity to constant weight. The sample was then immersed in an aqueous solution (50 g.) of initiator and monomer, the solution containing (a) $10^{-2}$ mole/litre of potassium persulphate
(b) $10^{-3}$ mole/litre tartaric acid, and
(c) $10^{-3}$ mole/litre of ferrous ammonium sulphate.

No precautions were taken to preclude or remove oxygen from the reaction system. The pH of the solution was adjusted to 2 with sulphuric acid.

The reaction was carried out for 60 minutes at 30° C. The wool sample was then removed from the solution, washed under running water and dried under vacuum at 40° C. After drying, the wool was reconditioned to constant weight in an atmosphere of 65% relative humidity.
The results obtained were as follows:

| Example | Monomer (percent by wt. of solution) | To weight gain of wool after 60 minutes polymerization |
|---|---|---|
| 74 | 5% acrylonitrile | * 19.13 |
| 75 | 5% NEMA | 50.05 |

* Slight surface polymer.

EXAMPLES 76–81

The same procedure as in Examples 74–5 was followed except that the wool after conditioning, was first soaked in an aqueous solution of one or two of the three initiator system components for about 15 minutes. The wool was then blot dried and transferred to a polymerization solution containing the monomer and the component(s) of the initiator system other than those used in the pre-soaking step.

The results obtained were as follows:

| Ex. | Monomer (percent by weight of mixture) | Pre-soak medium | Percent weight gain after 60 minutes polymerization |
|---|---|---|---|
| 76 | 5% AN | $K_2S_2O_8$ | 19.6 (A) |
| 77 | 5% AN | Ferrous ammonium sulphate | 16.74 (C) |
| 78 | 5% AN | Tartaric acid | 21.15 (B) |
| 79 | 5% AN | Ferrous ammonium sulphate, $K_2S_2O_8$. | 3.25 |
| 80 | 5% AN | Tartaric acid, $K_2S_2O_8$ | 27.26 (B) |
| 81 | 5% AN | Tartaric acid, ferrous ammonium sulphate. | 7.12 (C) |

A=slight surface polymer.
B=traces of surface polymer.
C=no surface polymer.

The surface polymer represented not more than 2% or 3% of the total polymer deposited.

EXAMPLE 82

The procedure of Example 80 was repeated at various pH values for the solution containing the monomer. The results obtained, which are set out below, show that the maximum weight gain occurred at pH 2 and the weight gains decreased as the pH was raised or lowered from this value.

| Percent gain in weight | pH |
|---|---|
| 12.3 | 0.65 |
| 12.8 | 1 |
| 12.9 | 1.5 |
| 27.2 | 2 |
| 6.3 | 3.2 |
| 0.8 | 4.45 |
| 1.2 | 5.6 |
| 0.8 | 6.8 |

EXAMPLE 83

The procedure of Examples 74–5 was repeated except that the ferrous ammonium sulphate was replaced by ferric nitrate ($10^{-3}$ mole/litre). After 60 minutes polymerization, the gain in weight of the wool was 19.4% with only slight surface polymer deposition.

EXAMPLES 84–89

The procedure of Examples 76–81 was repeated except that ferric nitrate ($10^{-3}$ mole/litre) was used in place of the ferrous ammonium sulphate. The results obtained were as follows:

| Ex. | Monomer (percent by weight of mixture) | Pre-soak medium | Percent weight gain after 60 minutes polymerization |
|---|---|---|---|
| 84 | 5% AN | $Fe(NO_3)_3$ | 18.2 (C) |
| 85 | 5% AN | $K_2S_2O_8$ | 15.6 (A) |
| 86 | 5% AN | Tartaric acid | 17.3 (A) |
| 87 | 5% AN | $K_2S_2O_8$, tartaric acid | 13.3 (A) |
| 88 | 5% AN | $K_2S_2O_8 + Fe(NO_3)_3$ | 6.5 (B) |
| 89 | 5% AN | Tartaric acid, $Fe(NO_3)_3$ | 12.6 (C) |

A=slight surface polymer.
B=trace of surface polymer.
C=no surface polymer.

Having thus described the invention, what is claimed is:
1. A method of polymerizing ethylenically unsaturated polymerizable monomers in an aqueous medium, said method comprising initiating the polymerization with an initiator system comprising from $10^{-4}$ mol to 1 mol per liter of the reaction medium of a first member selected from the group consisting of water-soluble ferrous and ferric salts, said salts being free of anions which interfere with polymerization; from $10^{-4}$ mol to 1 mol per liter of the reaction medium of a second member selected from the group consisting of water-soluble peroxides and persalts; and from $10^{-4}$ mol to 1 mol per liter of the reaction medium of a third member, said third member being a water-soluble aliphatic or aromatic organic compound which is capable of forming complexes with ferrous and ferric ions and which is devoid of substantial degradative transfer activity in the polymerization reaction; said water-soluble, aliphatic, organic compound being selected from the group consisting of tartaric acid, dihydroxytartaric acid, citric acid, malic acid, glyceric acid and aspartic acid; said water-soluble aromatic organic compound being selected from the group consisting of 3,4-dihydroxybenzaldehyde, 1-3-dihydroxybenzene, 3,4-dihydroxybenzoic acid, 3-5-diaminobenzoic acid, 2-hydroxy-4-aminobenzoic acid, 1,2-dihydroxybenzene-3,5-disulphonic acid and 3,4,5-trihydroxybenzoic acid and said aqueous medium having a pH from 2 to 8.

2. A method as defined in claim 1 wherein said polymerization is carried out in the presence of a keratinous fiber.

3. A method as defined in claim 1 wherein said third member is a water-soluble, aromatic organic compound.

4. A method as defined in claim 1 wherein said third member is a water-soluble, aliphatic, organic compound.

5. A method as defined in claim 1 wherein said aqueous medium has a pH between 2 to 4.

6. A method as defined in claim 1 wherein said first member is a ferrous salt.

7. A method as defined in claim 1 wherein said first member is a ferrous salt and said third member is tartaric acid.

8. A method as defined in claim 1 wherein said first member is a ferrous salt and said third member is dihydroxytartaric acid.

References Cited
UNITED STATES PATENTS

| | | | |
|---|---|---|---|
| 2,982,761 | 5/1961 | Campbell | 260—85.5 Orig. |
| 3,135,722 | 6/1964 | Logemann | 260—88.7 C |
| 3,165,500 | 1/1965 | Logemann | 260—88.7 C |
| 3,193,537 | 7/1965 | Dinges et al. | 260—85.5 M |

HARRY WONG, JR., Primary Examiner

U.S. Cl. X.R.

117—140; 260—29.6, 85.5, 89.1, 89.5, 89.7, 93.5; 424—71